Dec. 27, 1966 G. T. SCHULER ETAL 3,294,084
POTENTIAL MEASURING AND DISPLAY APPARATUS, ESPECIALLY
FOR ELECTROCARDIOGRAPHIC OR LIKE USE
Filed May 14, 1964 2 Sheets-Sheet 1
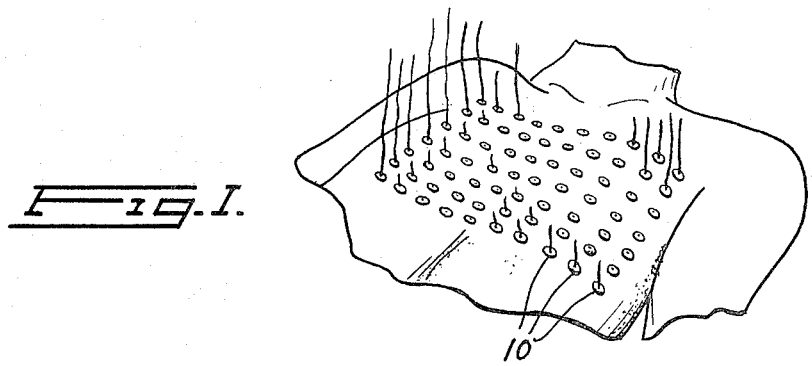
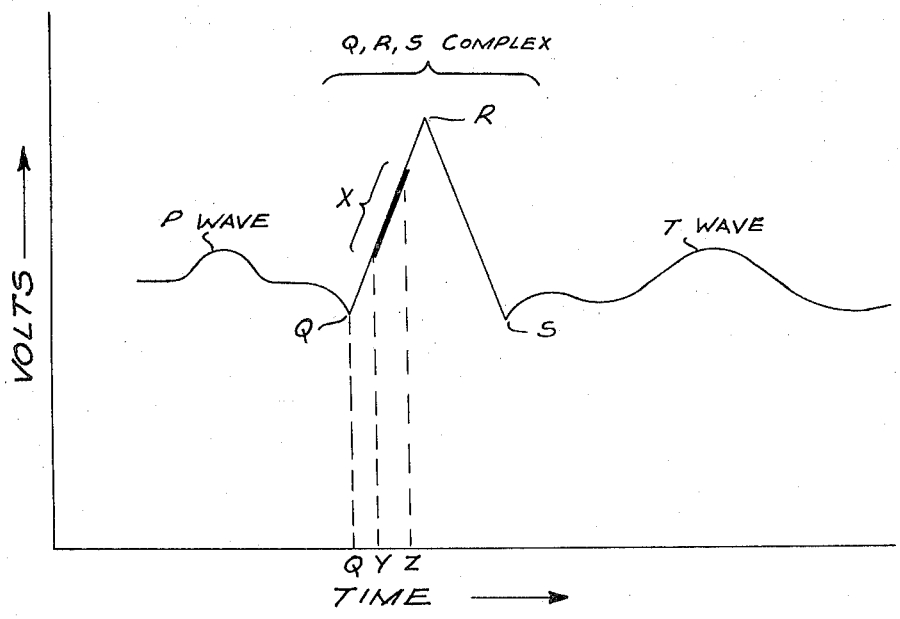
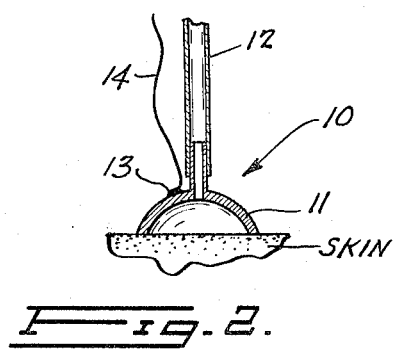
Inventors
Graham T Schuler
Orest Z. Roy
Stevens, Davis, Miller & Mosher
Attorneys

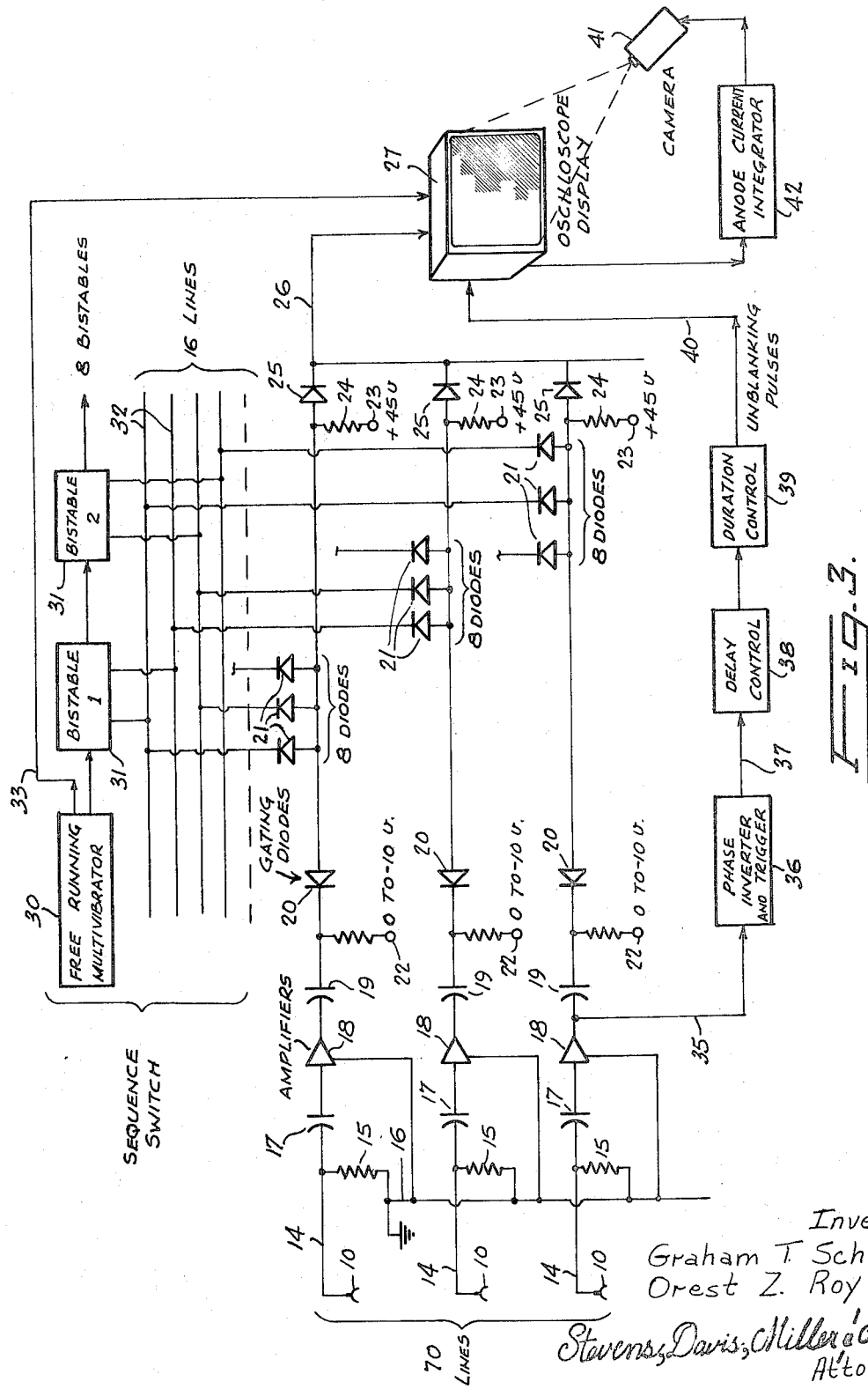

United States Patent Office 3,294,084
Patented Dec. 27, 1966

3,294,084
POTENTIAL MEASURING AND DISPLAY APPARATUS, ESPECIALLY FOR ELECTROCARDIOGRAPHIC OR LIKE USE
Graham T. Schuler, Kingston, Ontario, and Orest Z. Roy, Ottawa, Ontario, Canada, assignors to National Research Council, Ottawa, Ontario, Canada, a body corporate
Filed May 14, 1964, Ser. No. 367,411
6 Claims. (Cl. 128—2.06)

This invention relates to improvements in potential measuring and displaying apparatus especially adapted for electrocardiographic or electroencephalographic use.

Present day electrocardiographs consist of one or more simple tracings plotted against time of the voltage at one or more locations on the surface of the patient's chest in the vicinity of the heart. Each such voltage is actually the algebraic sum of the voltages at two sites one of which is a "ground" or reference voltage obtained from some relatively remote area of the patient's body, for example the left leg. This system, devised empirically on a clinical basis, reduces the voltage information to a conveniently simple result. Electroencephalographs are essentially the same in the information they yield.

The principal object of the present invention is to provide an area display of such body voltages in which a number of measurements are taken and displayed simultaneously and in which such measurments are related to one another and displayed in a manner facilitating interpretation. Preferably the measurements are related to one another, in time, amplitude and space, and are displayed in a time, amplitude and space manner facilitating interpretation.

Another object of the preferred form of the present invention is to provide an improved manner of recording the information so displayed.

The invention may be carried into practice in the manner described below and illustrated in the accompanying drawings. It should be understood that such illustration of the invention is provided by way of example only and not by way of limitation and that the broad scope of the invention is defined in the appended claims. For example, while the invention has been developed primarily for the detection and display of body potentials, the apparatus is not necessarily restricted to use for this purpose. It may be used in any instance where a number of closely related voltages are required to be displayed in a spatial array.

In the drawings:

FIGURE 1 is a perspective view illustrating a manner of attaching a plurality of electrodes to a patient's chest;

FIGURE 2 is a sectional view of a suction cup electrode employed for this purpose;

FIGURE 3 is a circuit diagram; and

FIGURE 4 is a graph of the electrical activity accompanying each heart beat.

FIGURE 1 shows seventy suction cup electrodes 10 secured to a patient's chest, in and around the vicinity of the heart. The number of electrodes employed can vary as required by the cardiologist, as can their location on the patient's chest. For example, the cardiologist may wish to examine more closely one particular area, in which case he may move the electrodes closer together and concentrate them at such area. The suction cup electrodes 10 illustrated in the drawings are standard medical equipment, and, if necessary, smaller electrodes may be used, whenever it is desired to crowd a number closely together in a given area. The structure of the electrodes 10 which is conventional is illustrated in FIGURE 2, each electrode consisting of a metal (for example aluminum) hollow cup portion 11 which can be evacuated through tube 12, a standard electrocardiographic paste (a conductive jelly) being first applied between the cup edges and the patient's skin. An electrical contact 13 serves to solder a lead 14 to the metal cup 11.

Assuming that seventy such electrodes 10 are employed, arranged in seven rows of ten electrodes per row, a total of seventy electrical leads 14 will form the inputs to the circuit shown in FIGURE 3. Each input lead 14 is connected through a high resistance (100 kilohms) resistor 15 to a common line 16. In this way, the "ground" or reference potential on the line 16 becomes the average of the potentials on all the lines 14, and this reference voltage is used as the "ground" for each of seventy amplifiers 18. As a result, the voltage detected on each individual line 14 is the voltage on the respective line compared with the average voltage of the remainder of the lines 14, and not compared with the voltage on some other relatively unrelated datum such as a remote part of the patient's body, e.g. the left leg. The present arrangement by which the reference voltage is formed from the average of all the other voltages being simultaneously measured in the same general vicinity of the patient's body provides a much more informative and sensitive system than any of those previously employed.

The voltage on each input lead 14 is conveyed through a capacitor 17 to a respective amplifier 18 (the internal structure of which is conventional) and hence through a further capacitor 19 to the negative plate of a gating diode 20.

A known sequence switch cycles the seventy gating diodes. This switch comprises a free running multivibrator 30 which actuates a series of eight bistable circuits 31 in the usual manner of a shift register. The two outputs from each of the bistable circuits 31 are conveyed to a pair of lines 32 of which there will be sixteen in all. The positive electrode of each of the seventy diodes 20 is connected through eight diodes 21 to a unique combination of the sixteen lines 32. A negative bias, which can be varied between 0 and −10 volts, is applied at terminal 22 to act on the negative plate of each diode 20, and a positive bias of +45 volts is applied at terminal 23 to act through a high resistance 24 on the positive plate of each diode 20. The bistable circuits 31 are so constructed as to go from 0 volts in the 0 state to −12 volts in the 1 state. Each diode 20 that is connected to any one line 32 that is energized to −12 volts is reverse biased, because this voltage overcomes the positive voltage from terminal 23. Each time the multivibrator changes state another set of eight diodes 21 is connected to eight lines 32 that are now all at zero volts, and the associated diode 20 becomes forward biased. The only time a diode 20 is biased for conduction is when all its diodes 21 go to bistables at zero volts. If any one connection to −12 volts is made the diode 20 is non-conducting. At any one time all the diodes 20 are reverse biased in this way except one. As this operation proceeds one after the other of the diodes 20 becomes momentarily forward biased so that the signal from the output of the associated amplifier 18 can pass through a further diode 25 to a common output line 26. The circuit just described thus acts as a sequence switch and can conveniently be cycled at a comparatively high rate say 400 times per second.

The voltage on the output line 26 serves to modulate the intensity of the beam of an oscilloscope display 27 of the conventional kind. The seventy detected voltages can thus be displayed in seven rows of ten small areas corresponding spatially to the location of the related electrodes on the patient's chest. The sweep circuits of the oscilloscope 27 are synchronized with the sequence switch by line 33.

A further feature of the present invention is triggering of the visible display from the output of one of the amplifiers 18. FIGURE 3 shows a lead 35 taken from the output of the third of the illustrated amplifiers 18, although any other one of the seventy amplifiers could be chosen for this purpose. In practice, it will be convenient to choose an amplifier which corresponds to an electrode located directly over the patient's heart.

A typical potential wave of a heart beat is shown in FIGURE 4 with certain portions exaggerated somewhat on the time scale for purposes of easy demonstration. This diagram shows those parts of the heart wave known as the P wave, the QRS complex and the T wave. A convenient triggering point will be chosen, say point Q. Line 35 in FIGURE 3 feeds to a phase inverter 36 which generates a peak positive voltage at point Q and on comparing such voltage with a predetermined internal voltage emits a trigger pulse in line 37. This trigger pulse passes to a delay control circuit 38 which in turn feeds an output pulse to a duration control circuit 39, the setting of the delay control circuit 38 determining the point in time at which the circuit 39 is pulsed. Assume that this is at time Y in FIGURE 4. The setting of the duration control circuit 39 determines another time interval terminating, for example, at time Z. The duration control circuit 39 normally emits a continuous blanking voltage on line 40, which blanking signal passes to the oscilloscope display 27 to render the same ineffective. During the triggered time Y to Z, designated X in FIGURE 4, this blanking voltage is cancelled by what may be considered as an unblanking pulse. As a result the oscilloscope display 27 is operative during the time Y to Z and only during this time. It follows that the picture formed on the screen of the display 27 represents the voltage readings of the seventy electrodes 10 during portion X of the heart beat. This performance is repeated for each successive heart beat and may be recorded by a camera 41. A film in the camera 41 can be exposed to a succession of such displays, since these will all represent the same period X of successive heart beats, and the final picture built up on the film will be an integration of a number of such displays. The camera might typically be left open about a minute to record approximately 60 energizations of the display 27 (assuming 60 heart beats per minute). To obtain the optimum film exposure, an anode current integrator 42 can be employed to integrate the total anode current passing through the display tube and to close the camera shutter as soon as a given total current (corresponding to a total amount of light energy) has been passed. The resulting picture will be a composite of seventy small areas of various light intensities. Conveniently, a more negative potential on each electrode 10 can be represented by a lighter area in the corresponding location, and a more positive potential by a darker area, although this polarity can be reversed, if desired. The light intensity can be varied by control of the bias voltage on electrode 22.

It will be apparent that the cardiologist can closely examine any portion of the heart beat that he wishes. Delay control circuit 38 is used to move the point Y and duration control circuit 39 is used to modify the distance Y to Z, as required.

The integration of a number of successive displays tends to minimize the effect of any spurious results obtained from noise or other irregularity in a given display. In other words, a truly average picture is obtained.

After having thus exposed one film to the portion X of the heart wave, the next film may conveniently be exposed to the portion of the heart wave beginning at time Z, and so on. In practice, these time intervals can be made much shorter than the time X, which has been shown quite large in FIGURE 4 for ease of illustration. In this way, each successive photograph will represent an integrated picture of the voltages at a number of locations on the patient's chest built up from the same short section of the heart wave of successive heart beats and these sections can be made to be contiguous or even to overlap, as desired. A sequence of films produced in this fashion then becomes, in effect, a movie film of the heart action (as represented by the electrocardiographic potentials) made available at a greatly slowed down rate but with the increased accuracy resulting from the integration of a large number of heart beats. Pictures made in this way can be displayed either as stills or in the form of a moving picture.

Alternatively, the oscilloscope display may be continuously illuminated throughout many cardiac cycles permitting direct cinematography or direct visual observation of the changing patterns.

Although the invention has been developed primarily for electrocardiographic purposes, it is applicable to the detection and display of any group of voltages, especially the surface voltages on other parts of a patient's body wherever these voltages are significant for medical diagnosis purposes, for example in electroencephalographic examinations.

We claim:
1. Apparatus for detecting and displaying simultaneously a plurality of potentials, comprising
   (a) a plurality of electrodes arranged in a spatial array,
   (b) means connected to each electrode for determining the difference between the potential detected by such electrode and the average of the potentials detected by the remaining electrodes,
   (c) and means connected to said potential difference determining means for generating and displaying a spatial array of visible signals corresponding to the spatial array of the electrodes, said visible signals each corresponding to said potential difference for a respective electrode,
   (d) wherein said display means comprises an oscilloscope display on which said visible signals each appear as an area having a light intensity corresponding to said potential difference of a respective electrode.

2. Apparatus according to claim 1 including means connected to one of said electrodes for selecting a predetermined interval of a potential wave on said electrode and for rendering said display means operative only during said interval of successive such waves.

3. Apparatus according to claim 2, including a camera for recording the display produced by said display means.

4. Apparatus according to claim 3, including means sensitive to the total intensity of a plurality of successive said displays for controlling the number of said displays recorded on a film in said camera.

5. Apparatus for simultaneously detecting, displaying and recording a plurality of potentials of a patient's body, comprising
   (a) a plurality of electrodes for attachment in a spatial array to a patient's body,
   (b) means connected to each electrode for determining the difference between the potential detected by such electrode and the average of the potentials detected by the remaining electrodes, (c) means including an oscilloscope display and sequence switch means for sampling said potential differences in synchronism with the sweep of said display, for displaying a spatial array of areas of light intensity corresponding respectively to the potential differences detected by said electrodes, (d) means normally blanking said display, (e) and triggering means sensitive to a predetermined interval of a potential wave for over-riding said blanking means to render said display operative during said interval of successive said waves.

6. Apparatus according to claim 5, including a camera for recording said display during successive operative intervals thereof, and means for terminating exposure of a film in said camera, said last-mentioned means being sensitive to the total intensity of a plurality of successive said displays.

References Cited by the Examiner

UNITED STATES PATENTS

| | | | |
|---|---|---|---|
| 2,227,135 | 12/1940 | Hollman | 128—2.06 |
| 2,659,363 | 11/1953 | Brosselin | 128—2.06 |
| 2,932,549 | 4/1960 | Kling et al. | 346—110 |
| 3,186,403 | 6/1965 | Bassett | 128—2.06 |

RICHARD A. GAUDET, *Primary Examiner.*

SIMON BRODER, *Examiner.*